3,351,585
PREPARATION OF FINE HMX
Paul L. Lee and Glenn E. Sims, Kingsport, Tenn., assignors to Eastman Kodak Company, Rochester, N.Y., a corporation of New Jersey
Filed Jan. 28, 1966, Ser. No. 523,734
4 Claims. (Cl. 260—239)

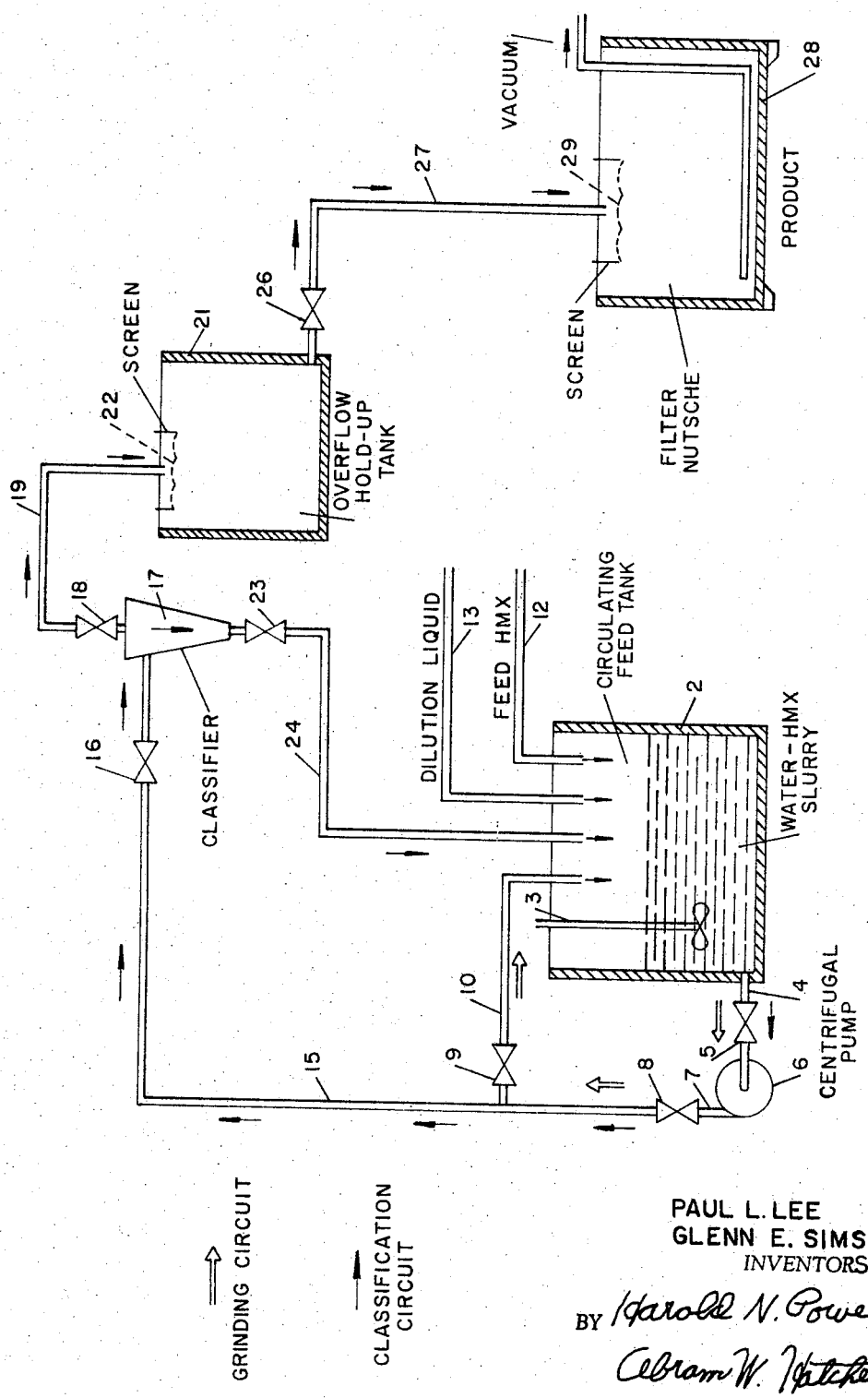

ABSTRACT OF THE DISCLOSURE

A process for agglomerating cyclic nitramine and cyclic nitrated explosive fines by adding to a water slurry of the fines a straight or branched-chain $C_4$–$C_8$ alcohol immiscible in water. The agglomerated product is then filtered and dried to remove excess liquids resulting in a pelletized product which is easily dispersed or rewet.

This is a continuation-in-part of Ser. No. 135,355, filed Aug. 31, 1961, now U.S. Patent No. 3,239,502. Ser. No. 135,355 was in turn a continuation-in-part of Ser. No. 11,891, filed Feb. 29, 1960, now U.S. Patent No. 3,069,477.

This invention relates to the production of HMX and other nitrogen-containing explosives in a certain form and purity. More particularly, this invention concerns the production of such explosives in the form of crystals or particles that may be more easily redispersed than heretofore possible.

HMX is a known explosive material described in various publications such as "Journal of the American Chemical Society," vol. 73, 1951, pages 2769–2773. Page 2772 of said publication refers to the HMX in the form of large and colorless bipyramid crystals. This explosive product may also be known as cyclotetramethylenetetranitramine. However, for convenience of description herein the simpler term HMX will be used.

In the industry there has developed a demand for HMX and like explosives in the form of fine particles and especially for HMX of the beta-polymorphic modification. As is known, HMX may exist in several polymorphic forms such as the alpha- beta, gamma and delta. The beta form is preferred because of its lower sensitivity, it being apparent from such sensitivity characteristics that such beta form is more adaptable to certain utilization.

It is therefore believed apparent that the development of procedures for obtaining fine HMX and other nitrogen-containing explosives, such as more specifically set out hereinafter, of relatively good purity and improved dispersibility represents a highly desirable result. After extensive investigations, we have found a process whereby crude HMX may be converted to an improved fine HMX of excellent purity and redispersibility.

One object of this invention is to provide an improved method of agglomerating relatively fine HMX to an improved product which is easily dispersed or rewet when in dry powder form. Other objects will appear hereinafter.

According to our improved process liquid containing fine HMX, RDX or the like, produced, for example, by the recycling-grinding process of our above-mentioned U.S. Patent 3,069,477, is agglomerated by adding to a water slurry thereof a stright or branched-chain $C_4$–$C_8$ alcohol immiscible in water. We have found that cyclic nitramine and cyclic nitrated explosives fines in general may be agglomerated by this procedure. Representative of this group are TNT (trinitrotoluene), cyclotrimethylenetrinitramine (cyclonite or RDX), 2,4,6-trinitrophenylmethylnitramine (tetryl), pentaerythritol tetranitrate (PETN), ammonium picrate (explosive D), 1,2,3,5-tetranitroaniline TNA), 1,3 - diamino-2,4,6-trinitrobenzene (DATB) and the like. Representative straight or branched-chain $C_4$–$C_8$ alcohols which can be used include n-butyl alcohol, isobutyl alcohol, secondary butyl alcohol, tertiary butyl alcohol, n-amyl alcohol, isoamyl alcohol, tertiary amyl alcohol, neopentyl alcohol, n-hexyl alcohol, n-octyl alcohol and 2,2-dimethyl butanol. Preferred agglomerants are n-butyl alcohol and isobutyl alcohol. Amyl alcohol can also be used. These alcohols have an advantage in that the materials agglomerated or pelletized thereby are more easily dispersed or rewet when in dry powder form.

The agglomerating agent may be used in conjunction with a comparatively small amount of dioctyl phthalate or other explosives desensitizer such as triacetin, dioctyl sebacate and the like. The particle size and stickiness of the agglomerated product may be controlled by the amount of agglomerating agent added and the length of the digestion period, that is, the length of time agitation is continued after all of the agglomerating agent has been added to the water dispersion. The optimum amount of agglomerating agent to be added is about 1 gram of agglomerating agent for every 5-gram batch of fines. The optimum retention or digestion time is from 10 minutes to a half-hour. When dioctyl phthalate or other suitable plasticizer is used in conjunction with one of the agglomerating agents, preferably being added prior to agglomeration, the impact sensitivity of the agglomerated product is reduced. After drying, the product is easily friable and may be conveniently packaged by bagging or conveying into drums. The resulting product is of improved redispersibility or rewettability.

The attached drawing comprises a semidiagrammatic side elevation view of an apparatus arrangement (in the nature of a flow sheet) which may be used in producing explosives fines such as can be agglomerated as described herein. In describing the drawing HMX will be used as an illustrative explosive.

Referring to the drawing, there is provided a large circulating-type tank 2. While it is preferred to construct this tank from stainless steel or the like type of metal material, the tank may be constructed from other materials such as aluminum, glass, or glass-lined metal. The tank may be of any desired capacity depending on the quantities of product that it is desired to process. However, we have found that a tank of approximately 1100 gallons size is quite useful for carrying out the present process and for obtaining good circulation and temperature control. In a similar manner, the various pipes and valves to be referred to hereinafter may be constructed of materials such as aluminum and other nonferrous metals, stainless steel, plastics such as polyvinyl chloride, and cellulose ester material such as that sold under the trademark Tenite Acetate and Tenite Butyrate.

In general we would have one or more agitator devices 3 positioned within the tank. On the larger tanks, several such type agitators may be desirable. Since such type agitators are standard items, extended description is unnecessary.

The lower part of the tank is provided with the withdrawal conduit 4 which leads through valve 5 to a centrifugal pump 6. The pump is connected by conduit 7 through valves 8, 9 and conduit 10 in a manner that the contents of the tank may be withdrawn from the bottom thereof and pumped back into the top of the tank.

Tank 2 is also provided with inlet conduits 12 and 13. These conduits are for the purpose of introducing into the tank the feed HMX which it is desired to convert to the HMX fines and to provide for the introduction of the diluent liquid. The diluent liqiud is usually and preferably water. However, in some instances a certain amount of organic solvent exemplified by acetone, alcohol and the like may be introduced.

Pump 6 is also connected by means of conduit 15 through valve 16 to the cyclone separator and classifier 17. This cyclone separator can be of a commercially obtainable construction. It can be 6 inches or less in diameter equipped with four vortex finders and five apex valves. A nominal 6-inch diameter cyclone equipped with a 1-inch apex valve and 1¼ inch vortex finder can be used in the cyclone classification.

The upper part of the cyclone classifier is connected through valve 18 and conduit 19 to the overflow hold-up tank 21. The discharge from conduit 19 preferably is passed through a classifying screen 22. The lower outlet portion of separator 17 is connected through valve 23 and conduit 24 so as to discharge back into feed tank 2.

The hold-up tank 21 just mentioned can be constructed of any of the metal materials referred to above and be of any desired size. We have found that a size of the order of 4400 gallons is satisfactory. In place of a single tank, two or more tanks can be employed.

The tank 21 is connected through valve 26 and conduit 27 to a vacuum filter 28. Since such vacuum filter is a known commercial item, description of the construction thereof appears to be unnecessary. Preferably the discharge from conduit 27 into this vacuum filter will be passed through a suitable screen 29.

The following examples are presented to illustrate our process for producing a new agglomerated explosive and the improvements resulting therefrom.

*Example I*

In this example the feed HMX was of about a 95% initial purity. This feed HMX which it was desired to convert to HMX fines was processed by the following steps:

(A) Charge the HMX into tank 2. The amount charged preferably is within the limits of 2500–3000 pounds.

(B) Add water to tank 2 until the level is raised a few inches. Then start and stop agitator until it turns freely. With agitator running, continue to add water until the agitator impeller and hub are completely covered.

(C) At this point, the slurry should be agitating and circulating well throughout the tank. If not, add water until circulation is good.

(D) Open tank outlet valve 5, pump discharge valve 8 and valve 9 on slurry header above top of tank 2.

(E) Start tank slurry centrifugal pump and throttle pump discharge valve 8 by closing it about several turns, or until slurry returning to the tank appears to have little or no force behind it. This will hold the slurry in the pump head and allow the impeller to mildly break down the crystals.

(F) With the pump and agitator running, pump and grind the diluted crude HMX for about 16 hours, preferably without stopping the pump or agitator.

(G) While the slurry is circulating and grinding, the slurry temperature will gradually increase to 50–60° C. As it heats up, introduce cool water into the tank every 15–20 minutes such as by washing down the sides of the tank. If the slurry becomes thick and does not agitate well throughout the tank, add more water to the tank until it does so. In general the tank is kept closed when not adding water or washing down tank.

(H) After grinding for approximately 16 hours, add further water to tank 2.

(I) Open valve 16 in a slurry line above pump leading to the cyclone separator 17. This will allow the slurry to flow to the cyclone separator where the HMX fines overflow from the top into tank 21 and the coarse underflow flows back from the bottom of the separator to the feed tank 2.

(J) As the fines overflow into the collection tank 21, the grist size can be reasonably checked by using an 8"-diameter, 200-mesh laboratory screen. As long as the slurry either passes on through the screen freely or can be washed through with a small stream of water, it can be assumed that the HMX will have the desired fine size preferably of less than about 44 microns.

(K) Whenever the HMX piles up on the 200-mesh screen and will not wash through, or the level in tank 2 gets to the point where the pump stops pumping, close valve 16 on circulating line leading to separator and valve 18 on overflow line.

(1) If the material left in tank 2 appears coarse and there is over 500–600 pounds, repeat the grinding step as described above and then again feed to the cyclone separator as described above.

(2) If the material left in tank 2 only amounts to 200–300 pounds, leave it in tank for repeated operation, with a further supply of crude HMX feed.

(L) Allow the material in tank 21 to settle overnight or longer.

(M) After settling, if liquid is clear in tank 21, decant the water out of the tank down to within 6–8 inches of the HMX cake on the bottom of the tank.

(N) Agitate contents of tank 21 for about 15 minutes.

(O) Drop slurry into nutsches 28 through a 60-mesh screen 29. It is desirable to make sure that the nutsches are clean and that probe socks are in good condition with no holes.

(P) Put vacuum on nutsches 28 and dewater. Usually pulling vacuum continuously for 24–36 hours will lower the moisture content of the nutsches to approximately 30%.

(Q) Sample the product for analysis, and, if sufficiently dry and otherwise satisfactory, it may be packaged by bagging or conveyed into drums.

Tests of the product produced by the foregoing example showed that the HMX particles were of the desired size of less than about 44 microns. By controlling the time of recirculation we have produced HMX particles of any desired size from 5–120 microns, although best results were achieved in the 10–25 micron particle size range. Also, the purity was in excess of 97% and the product predominantly the beta-polymorphic modification.

At step L above our procedure leading to the pelletization or agglomeration of the fine HMX can be used as follows. To separate portions of a slurry of this product were added respectively technical grade n-butyl alcohol (30%), isobutyl acohol (30%), n-amyl alcohol (30%) and isoamyl alcohol (30%) while the masses were under agitation. The above percentages relate the amount of the agglomerating agent to the weight of the HMX or other explosive suspended. This process was accomplished at substantially room temperature or ambient temperatures. Agitation was continued until visible agglomeration occurred in each. After 10–15 minutes the material from each portion was separately dropped to a vacuum filter and the water removed very rapidly. The agglomerated product in each case retained its structure during normal handling. It was dried to substantial dryness and then packaged. The packaged material was more readily redispersible than similar material agglomerated with n- or isobutyl acetate or with cyclohexanone.

*Example II*

Approximately 525 pounds of a nominal 18-micron HMX (having 89 weight percent passing the the USSS No. 325, i.e., less than 44 micron) was slurried in approximately 2100 pounds of water. After dispersion in a homogeneous mixture, approximately 360 pounds of isobutyl alcohol were added until pelletization or agglomeration was induced. The resulting slurry of pelletized explosive was filtered to remove the excess liquids, and the resulting pelletized HMX was allowed to drain to a volatile content of about 15 weight percent before packaging. The resulting product had a bulk density of 0.85 gm./ml. and analyzed 4.7 weight percent alcohol and 10.6 weight percent water. The particle size distribution of the product was:

| U.S. Sieve Series (USSS) No.: | Weight percent passing |
|---|---|
| 8 | 87.8 |
| 20 | 78.4 |
| 35 | 47.6 |
| 50 | 40.9 |
| 100 | 30.2 |

Thus, at least about 50% of the particles resulting from agglomeration with a straight or branched-chain $C_4$–$C_8$ alcohol pass a USSS No. 35 sieve, and the product has a bulk density in the neighborhood of about 0.85 gm./ml. Additional amounts of 120 pounds and 2000 pounds of HMX were produced in a similar manner.

*Example III*

The procedure of Example II was followed with good pelletization using $n$ and isobutyl alcohol and $n$ and isoamyl alcohol to agglomerate RDX and DATB.

*Example IV*

The recirculation grinding procedure of Example I was followed to produce TNT of fine particle size.

The invention has been described in detail with particular reference to preferred embodiments thereof, but it will be understood that variations and modifications can be effected within the spirit and scope of the invention as described hereinabove and as defined in the appended claims.

We claim:

1. A process for agglomerating a water slurry of fines of an explosive selected from the group consisting of cyclotetramethylenetetranitramine; cyclotrimethylenetrinitramine; trinitrotoluene; 2,4,6-trinitrophenylmethylnitramine; pentaerythritol tetranitrate; ammonium picrate; 1,2,3,5-tetranitroaniline; and 1,3-diamino-2,4,6-trinitrobenzene comprising adding a straight or branched-chain alcohol selected from the group consisting of n-butyl alcohol, isobutyl alcohol, secondary butyl alcohol, tertiary butyl alcohol, n-amyl alcohol, isoamyl alcohol; tertiary amyl alcohol, neopentyl alcohol, n-hexyl alcohol, n-octyl alcohol; and 2,2-dimethylbutanol thereto.

2. The process according to claim 1 wherein the straight or branched chain alcohol is n-butyl alcohol, isobutyl alcohol, n-amyl alcohol, or isoamyl alcohol.

3. The process according to claim 1 wherein the straight or branched-chain alcohol amounts to about 30% by weight of the explosive.

4. In a process for the production of cyclotetramethylenetetranitramine fines by submitting an aqueous slurry of crude cyclotetramethylenetetranitramine to a pumping recirculation treatment for at least 10 hours, the step of adding prior to filtering a straight or branched-chain $C_4$–$C_8$ alcohol selected from the group consisting of n-butyl alcohol, isobutyl alcohol, secondary butyl alcohol, tertiary butyl alcohol, n-amyl alcohol, isoamyl alcohol, n-hexyl alcohol, n-octyl alcohol, and 2,2-dimethylbutanol with agitation to a water slurry of cyclotetramethylenetetranitramine fines, thereby increasing the redispersibility of said fines.

References Cited

UNITED STATES PATENTS 3,239,502   3/1966   Lee et al. _____ 260—239

ALTON D. ROLLINS, *Primary Examiner.*